United States Patent
Kröller et al.

(10) Patent No.: US 11,680,154 B2
(45) Date of Patent: Jun. 20, 2023

(54) SILYL FUNCTIONAL COMPOUND FOR IMPROVING FLAME RETARDANT PROPERTIES

(71) Applicant: BYK-Chemie GmbH, Wesel (DE)

(72) Inventors: Thorsten Kröller, Dorsten (DE); Alessa Meyer, Ratingen (DE); Majdi Al-Masri, Alpen (DE); Frederik Piestert, Wesel (DE); Carl-Eric Wilen, Espoo (FI); Melanie Aubert, Littoinen (FI); Teija Tirri, Rusko (FI); Timo Ääritalo, Turku (FI)

(73) Assignee: BYK-Chemie GmbH, Wesel (DE)

( * ) Notice: Subject to any disclaimer, the term of this patent is extended or adjusted under 35 U.S.C. 154(b) by 124 days.

(21) Appl. No.: 17/603,065

(22) PCT Filed: Apr. 15, 2020

(86) PCT No.: PCT/EP2020/060514
§ 371 (c)(1),
(2) Date: Oct. 12, 2021

(87) PCT Pub. No.: WO2020/212377
PCT Pub. Date: Oct. 22, 2020

(65) Prior Publication Data
US 2022/0177674 A1   Jun. 9, 2022

(30) Foreign Application Priority Data

Apr. 16, 2019 (EP) .................... 19169527

(51) Int. Cl.
C08K 5/544 (2006.01)
C08K 3/22 (2006.01)
C08K 5/49 (2006.01)
C09K 21/02 (2006.01)
C09K 21/10 (2006.01)
C09K 21/12 (2006.01)
C08K 3/016 (2018.01)
C08K 5/00 (2006.01)

(52) U.S. Cl.
CPC .......... C08K 5/5477 (2021.01); C08K 3/2279 (2013.01); C08K 5/49 (2013.01); C09K 21/02 (2013.01); C09K 21/10 (2013.01); C09K 21/12 (2013.01); C08K 3/016 (2018.01); *C08K 5/0066* (2013.01); *C08K 2003/2224* (2013.01); *C08K 2003/2227* (2013.01); *C08K 2201/014* (2013.01)

(58) Field of Classification Search
CPC ...... C08K 5/5477; C08K 3/2279; C08K 5/49; C08K 3/016; C08K 5/0066; C08K 2003/2227; C08K 2003/2224; C08K 2201/014; C09K 21/02; C09K 21/10; C09K 21/12
See application file for complete search history.

(56) References Cited

U.S. PATENT DOCUMENTS

| | | |
|---|---|---|
| 10,227,482 B2 | 3/2019 | Arechederra |
| 2003/0220448 A1 | 11/2003 | Ozai et al. |
| 2009/0286060 A1 | 11/2009 | Sala et al. |
| 2013/0023609 A1 | 1/2013 | Menozzi et al. |

FOREIGN PATENT DOCUMENTS

| | | |
|---|---|---|
| CN | 106832409 A | 6/2017 |
| CN | 109354673 A | 2/2019 |
| EP | 2404968 A1 | 1/2012 |
| JP | S63297462 A | 12/1988 |
| KR | 20100069106 A | 6/2010 |
| WO | 9812253 A1 | 3/1998 |

OTHER PUBLICATIONS

International Search Report and Written Opinion for International Application No. PCT/EP2020/060514, dated May 20, 2020 (8 pages).
U.S. Appl. No. 17/603,070, filed Oct. 12, 2021, entitled "Silyl Functional Compound for Improving Flame Retardant Properties."

*Primary Examiner* — Patrick D Niland
(74) *Attorney, Agent, or Firm* — Fitch, Even Tabin & Flannery, LLP

(57) ABSTRACT

The invention relates to the use of a silyl functional compound b), which silyl functional compound comprises a N—O—Si bond, for improving the flame retardant properties of a composition comprising an organic polymer a), which is one of a thermoplastic polymer or a thermoset polymer or a mixture thereof.

16 Claims, No Drawings

SILYL FUNCTIONAL COMPOUND FOR IMPROVING FLAME RETARDANT PROPERTIES

The present invention relates to a composition comprising an organic polymer and a silyl functional compound comprising an N—O—Si-bond and the use of a silyl functional compound for improving flame retardant properties.

There is a need for thermoplastic polymer compositions having improved flame retardant properties. Existing flame retardant compounds need to be employed in relatively high concentrations to fulfill the desired effect although they are cost drivers in plastic formulations, and large amounts of flame retardant additive may alter the properties of the polymeric matrix material. Additionally, due to environmental and health concerns, it is desirable to reduce the use of toxic materials.

Examples for such flame retardant compositions are known from the state of the art. EP 2 404 968 describes an aromatic polycarbonate resin composition, comprising as a main resin material, an aromatic polycarbonate resin occupying 85 to 95 wt % of the main resin material and having a weight-average molecular weight of 37000 to 55000 in polystyrene equivalent molecular weight, and a polystyrene resin occupying 15 to 5 wt % of the main resin material and containing no rubber component. Additionally, polyfluoroolefin resin, an organic sulfonate flame retardant, and a silicon flame retardant are added to the resin material.

WO 98 12253 relates to a flame retardant composition comprising (A) a polymer which includes a copolymer of ethylene and at least one other comonomer including a vinyl unsaturated polybishydrocarbylsiloxane (I); and (B) an inorganic filler comprising at least one member selected from the group consisting of oxides, hydroxides and carbonates of aluminium, magnesium, calcium and barium.

Flame retardant compounds are required which overcome the drawbacks mentioned above and which offer a wide range of application and may be employed in various types of plastic formulations. The present invention addresses these needs. It relates to a composition having a non-toxic, highly active flame retardant compound with an excellent performance-price ratio applicable in multiple different plastics formulations.

The present invention covers the use of a silyl functional compound, wherein the silyl functional compound comprises a N—O—Si bond, for improving the flame retardant properties of a composition comprising an organic polymer a), which is one of a thermoplastic polymer or a thermoset polymer or a mixture thereof.

In a different embodiment, the present invention deals with a composition comprising a) an organic polymer and b) a silyl functional compound comprising a N—O—Si bond.

The organic polymer is any of a wide variety of polymeric types including polyolefins, polystyrenics, polyvinylchloride, polyamides and polyesters. For example, the polymer substrate may be selected from the group of resins consisting of polyolefins, thermoplastic olefins, styrenic polymers or copolymers, acrylonitrile-butadiene-styrene (ABS), polyamides, polyesters, polycarbonates and polymers which contain hetero atoms, double bonds or aromatic rings and mixtures thereof.

Another embodiment of the present invention is where the polymer is selected from the group consisting of polypropylene, polyethylene, thermoplastic olefin (TPO), high impact polystyrene, polycarbonate and polyethylene terephthalate. The polymer substrate may also be thermoplastic polyurethane, thermoplastic elastomer, polymethylmethacrylate, rubbers, polyesters, polyacrylonitrile or polyoxymethylene.

The thermoplastic polymer is more preferably a polyolefin like polyethylene, polypropylene or copolymers thereof. The thermoplastic polymer is most preferably polypropylene (PP). Polyethylene is preferably linear low density (LLDPE), low density (LDPE) or high density (HDPE). Mixtures of polypropylene with polyethylene are suitable substrates, for example PP/HDPE, PP/LDPE and mixtures of different types of polyethylene (for example LDPE/HDPE). Ethylene/propylene copolymers are also suitable substrates (polypropylene/polyethylene copolymers). TPOs are for instance blends of polypropylene homopolymers and impact modifiers such as EPDM or ethylene/alpha-olefin copolymers.

Further examples of suitable thermoplastic polymers are:

Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMVV), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods: a) radical polymerization (normally under high pressure and at elevated temperature). b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups.

Mixtures of the polymers for example mixtures of polypropylene with polyisobutylene, polypropylene with polyethylene (for example PP/HDPE, PP/LDPE) and mixtures of different types of polyethylene (for example LDPE/HDPE).

Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vi-nylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned above, for example polypropylene/ethylene-propylene copolymers, LDPE/ethylene-vinyl acetate copolymers (EVA), LDPE/ ethylene-acrylic acid copolymers (EAA), LLDPE/EVA, LLDPE/EAA and alternating or random polyalkylene/carbon monoxide copolymers and mixtures thereof with other polymers, for example polyamides.

Hydrocarbon resins (for example $C_5$-$C_9$) including hydrogenated modifications thereof (e.g. tackifiers) and mixtures of polyalkylenes and starch.

Polystyrene, poly(p-methylstyrene), poly(a-methylstyrene). Aromatic homopolymers and copolymers derived from vinyl aromatic monomers including styrene, a-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene. Hydrogenated aromatic polymers derived from hydrogenation of polymers, especially including polycyclohexylethylene (PCHE) prepared by hydrogenating atactic polystyrene, often referred to as polyvinylcyclohexane (PVCH). Hydrogenated aromatic polymers derived from hydrogenation of polymers.

Graft copolymers of vinyl aromatic monomers such as styrene or a-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures, for example copolymer mixtures known as ABS, MBS, ASA or AES polymers.

Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

Polymers derived from α,β-unsaturated acids and derivatives thereof such as polyacrylates and polymethacrylates; polymethyl methacrylates, polyacrylamides and polyacrylonitriles, impact-modified with butyl acrylate. Copolymers of monomers with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/ alkyl methacrylate/butadiene terpolymers.

Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned above.

Homopolymers and copolymers of cyclic ethers such as polyalkylene glycols, polyethylene oxide, polypropylene oxide or copolymers thereof with bisglycidyl ethers. Polyacetals such as polyoxymethylene and those polyoxymethylenes which contain ethylene oxide as a comonomer; polyacetals modified with thermoplastic polyurethanes, acrylates or MBS.

Polyphenylene oxides and sulfides, and mixtures of polyphenylene oxides with styrene polymers or polyamides. Polyurethanes derived from hydroxyl-terminated polyethers, polyesters or polybutadienes on the one hand and aliphatic or aromatic polyisocyanates on the other, as well as precursors thereof. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Polyureas, polyimides, polyamide-imides, polyetherimids, polyesterimids, polyhydantoins and polybenzimidazoles. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

Polycarbonates and polyester carbonates, polyketones, polysulfones, polyether sulfones and polyether ketones. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA HDPE, PA PP, PA/PPO, PBT/PC/ABS or PBT/PET/PC.

In one embodiment, the organic polymer is a thermoplastic polymer, whereas in another embodiment, the organic polymer is a thermoset polymer.

Preferably, the composition additionally comprises one or more crosslinking components (c). Suitable crosslinking components are polyamines, polyisocyanates, phenolic and melamine based compounds. The one or more crosslinking components (c) may be present in the range of 0.05 to 10.00% by weight, preferably in the range of 0.05 to 8.00% by weight and more preferably in the range of 0.10 to 5.00% by weight, calculated on the weight of the components a)+b).

The composition according to the present invention further comprises a silyl-functional compound comprising an N—O—Si bond. The silyl-functional compound comprises at least one nitrogen atom and at least one Si atom.

A particularly beneficial effect of the invention is that component b) may be employed in relatively low amounts and still gives a significant improvement in fire retardant properties. Generally, component b) is present in the range of 0.1 to 15.0% by weight, preferably 0.1 to 10.0% by weight, calculated on the weight of the component a)+b). Even more preferably, the silyl functional compound b) is present in the range of 0.2 to 7.0% by weight and most preferably in the range of 0.2 to 5.0% by weight.

The silyl functional compound b) comprises a functional group comprising the N—O—Si bond, wherein the functional group may suitably have the formula (I)

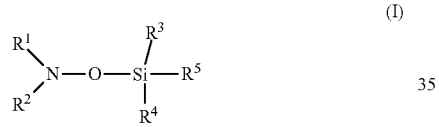

(I)

wherein any one of $R^1$, $R^2$, $R^3$, $R^4$ and $R^5$ is independently selected from an organic group and hydrogen. Preferably, any one of $R^3$, $R^4$ and $R^5$ is independently selected from an organic group.

Organic groups are functional groups of one or more atoms of distinctive chemical properties. The atoms of functional groups are linked to each other and to the rest of the molecule by covalent bonds. Functional groups can also be charged or uncharged, linear or branched, cyclic or aromatic. Organic groups may comprise one or more heteroatoms, hydrocarbyl groups or mixtures thereof. The organic groups may contain one or more oxygen, halogen, nitrogen, sulfur and/or phosphorous atoms, as well as single, double and/or triple bonds.

In one embodiment, $R^1$ is hydrogen and $R^2$ is an organic group. $R^2$ may suitably be cyclohexyl, phenyl, acryl, t-butyl, n-hexyl, n-dodecyl.

In a different embodiment, R1-N-R2 together form a cyclic group, wherein the cyclic group preferably has one or more substituents.

Suitable substituents may be carbon or heteroatoms as well as aromatic or cyclic groups. Moreover, in case of at least two substituents these may form a cyclic or aromatic group.

The cyclic group may suitably be selected from a heterocyclic amine group and a cyclic imide group. Examples for heterocyclic Imide groups are phthalimide, maleimide whereas examples for cyclic amine groups are carbazole groups.

Suitable examples of the silyl functional compound are:

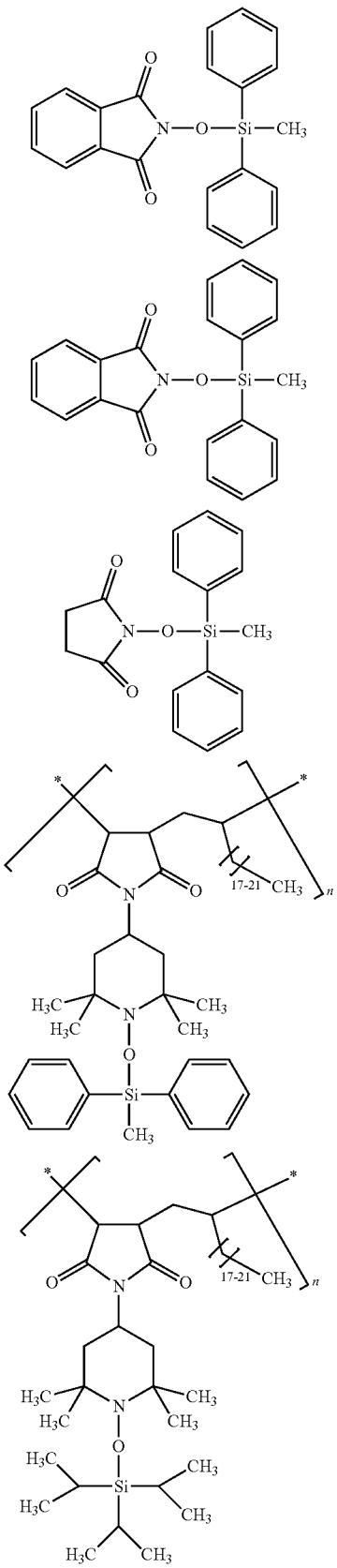

The silyl functional compound b) has generally a decomposition temperature of at least 140° C. Preferably, the decomposition temperature is at least 170° C. (Measurement by thermogravimetric analysis in an open platinum cup, temperature range: 30-600° C., heating rate 10 K/min air, device:TGA Q5000 V3.17 Build 265, TA Instruments. The decomposition temperature is the temperature at which the weight vs. temperature curve exhibits its maximum slope.)

Furthermore, the composition may additionally comprise at least one other flame retardant d) which is different from the silyl functional compound comprising a N—O—Si bond b). Suitably, the at least one flame retardant d) may be an organic flame retardant, an inorganic flame retardant or a mixture thereof.

Suitable examples for organic flame retardants which does not contain a silyl group are polytetrafluoroethylene, bismuth oxychloride, bismuth oxynitrate, bismuth oxychloride and organobromine flame retardant.

The organobromine flame retardants include any organic bromine compound capable of generating HBr or bromine radicals during thermal degradation.

The organobromine flame retardants include, without limitation, tetrabromobisphenol A (TBBPA) and its derivatives such as esters, ethers, and oligomers, for example tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, and copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl) triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis (tetrabromophthalimido)ethane, bis(tribromophenoxy) ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S, N'N'-ethylbis(dibromononbornene)dicarboximide, hexachlorocyclopentadieno- bis-(2,3-dibromo-1-propyl)phthalate, brominated phosphates like bis(2,3-dibromopropyl)phosphate and tris(tribromoneopentyl) phosphate and tris(dichlorobromopropyl)phosphite, N,N$^1$-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate.

Generally, the at least one other flame retardant d) may be selected from an inorganic flame retardant, a brominated flame retardant, a phosphorus based flame retardant, a magnesium flame retardant and a nitrogen based flame retardant.

Suitably, the at least one other flame retardant d) is an inorganic flame retardant, which is selected from aluminium trihydroxide, magnesium dihydroxide, antimony trioxide and mixtures thereof. Preferably, the at least one other flame retardant d) is a phosphorous compound such as a phosphate ester.

The flame retardants may be naturally occurring or synthetic, and they can be used alone or in combination with one another.

The at least one another flame retardant d) which is different from the silyl functional compound comprising a N—O—Si bond b) may be included in its usual amount. For example, it may suitably be added such as up to 30% by weight, with the exception of metal hydrates which may be included up to 70% by weight and fluoropolymer agents up to 1% by weight, all calculated on the weight of the sum of the components a) and b).

The components b) and d) can be premixed or added individually. They can be added before or during polymerization or crosslinking. Suitably, at least component b) of the composition is in a solid form, such as pellets, pastilles, flakes, granules or powder.

In another embodiment, at least component b) is suitably liquid at 23° C. and 100 kPa.

Further additives and components may be added to the composition. These components can be included in usual amounts and depending on the intended use. Examples of such additives are pigments, colorants, fillers, dyes, plasticizers, thixotropic agents, levelling agents, UV absorbers, metal passivators, antioxidants, lubricants, heat stabilizers, processing aids, deaerators and further polymeric and elastomeric components. These components may be included in an amount of 0.01 to 5.00% by weight, calculated on the weight of the components a+b.

Furthermore, the invention deals with a process for improving the flame retardant properties of a composition comprising the steps of Providing an organic polymer, which is a thermoplastic polymer or a thermoset polymer or a mixture thereof Providing a silyl functional compound comprising a N—O—Si bond Mixing the components by applying mixing means.

The compositions of the invention can be prepared by generally known methods, for example by mixing the components in the form of powders, and further treating the mixed components at elevated temperature under conditions of shear, for example in a kneader or in an extruder. The order of mixing or addition of the components is not critical for obtaining the desired result.

EXAMPLES

Preparation of Silylamines:

TABLE 1

| Educt | Description |
| --- | --- |
| N-Hydroxyphthalimide | Supplier: Sigma Aldrich, CAS Nr. 524-38-9 |
| Chloro(methyl) diphenylsilane | Supplier: Sigma Aldrich, CAS Nr. 144-79-6 |
| Triethylamine | Supplier: Sigma Aldrich, CAS Nr. 121-44-8 |
| Tetrahydrofuran | Supplier: Sigma Aldrich, CAS Nr. 109-99-9 |
| Hexane | Supplier: Sigma Aldrich, CAS Nr. 110-54-3 |
| Uvinul 5050H | Supplier: BASF, CAS Nr. 152261-33-1 |
| Hydrogen peroxide | Supplier: Sigma Aldrich, CAS Nr. 7722-84-1 |
| Ascorbic acid | Supplier: Sigma Aldrich, CAS Nr. 50-81-7 |
| 1-hydroxy-1H-pyrrole-2,5-dione | Supplier: Fisher scientific, CAS Nr. 6066-82-6 |

General Procedure to Prepare Silylamines:

Synthesis of Silylamines A and C:

Silylamines A and C were prepared using the formulation in table 2.

Xg Educt 1, Xg THF and Xg triethylamine were placed in a 2.0 liter three-necked round bottom flask equipped with mechanical stirrer and drop funnel as well as nitrogen inlet and condenser.

The mixture was cooled down to 5-6° C. Then Xg Educt 2 were added drop wise under nitrogen atmosphere with stirring within 15 min. After the addition was completed Xg of THF were added. The temperature was kept for further 10 min. before it was allowed to raise to 23° C. The stirring was continued under nitrogen atmosphere for further 2 h.

The solvent was removed from the filter cake by distillation using the rotary evaporator at 45° C. and 16.0 mbar. The mixture was washed with XmL of hexane and filtered under nitrogen atmosphere.

Synthesis of Silylamine B:

Xg Educt 1, Xml THF and Xg Hydrogen peroxide were placed in a 2.0 liter three-necked round bottom flask equipped with mechanical stirrer and drop funnel as well as nitrogen inlet and condenser. The stirring was continued under nitrogen atmosphere for further 24 h. A solution of Xg ascorbic acid in Xml THF was added within 1 hour interval. The mixture was heated up to 60° C. The mixture was cooled down to 5° C. Then Xg Educt 2 were added dropwise under nitrogen atmosphere with stirring within 15 min. After the addition was completed Xml of THF were added. The temperature was kept for further 10 min. before it was allowed to raise to 23° C. The stirring was continued under nitrogen atmosphere for further 4 h.

The solvent was removed by distillation using the rotary evaporator. The mixture was washed with Xml of hexane and filtered under nitrogen atmosphere.

TABLE 2

| Silylamine | Amount of Educt 1 [g] | Educt 1 | Amount of Educt 2 [g] | Educt 2 | Comment |
|---|---|---|---|---|---|
| A | 10.10 | N-Hydroxyphthalimide | 14.71 | $Ph_2MeSiCl$ | Triethylamine: 6.26 g<br>THF: 100 g + 23 g<br>Hexane: 400 ml |
| B | 183.9 | Uvinul 5050H | 14.30 | $Ph_2MeSiCl$ | Triethylamine: 6.20 g<br>THF: 100 g + 80 g<br>Hexane: 450 ml<br>Hydrogen peroxide: 1 g<br>Ascorbic acid: 10.71 |
| C | 7.05 | 1-hydroxy-1H-pyrrole-2,5-dione | 14.52 | $Ph_2MeSiCl$ | Triethylamine: 6.5 g<br>THF: 100 g + 80 g<br>Hexane: 400 ml |

TABLE 3

Decomposition temperature

| Silylamine | Decomposition temperature |
|---|---|
| A | 247° C. |
| B | 241° C. |
| C | 218° C. |

Performance Testing of Silylamines as Flame Retardant Synergists

The following examples show exemplarily the use of the Silylamines as flame retardant synergists in different plastics formulations. The performance of the products is compared to products, which are state of the art.

TABLE 4

| Raw Material | Description |
|---|---|
| Moplen HF 501N | Supplier: Lyondell Basell, CAS Nr. 9003-07-0 Homo polypropylen MFR 10 g/10 min (230° C./2.16 kg nach ISO 1133-1), |
| PCO 900 | Supplier: Thor, A Flammit PCO 900, organic phosphorus compound containing 24% phosphorus, flame retardant |

To show the effectivity of the Silylamines as flame retardant synergists in plastics formulations the components A-C were used in state of the art formulations and the flame retardancy performance was tested.

General Method of Preparation for Testing Silylamines in Polyethylene-Based Formulations:

Thermoplast:

Preparation according to the formulation in table 6 and 7.

Thermoplastic polymer powder was mixed with an additional flame retardant synergist. This mixture was fed to a dosing balance of an extruder (model Coperion ZSK 18 K38). The silylamine was fed to a side inlet of the extruder via a second dosing balance. Extrusion was carried out using the temperature profile detailed further below and at 300 rpm. The overall capacity of the extruder was 2 kg/h. The composition left the extruder via a slot die (dimensions 28 mm×3 mm) and was cooled. The extruded strings were granulated to particles having a size in the range of approximately 0.1 to 0.5 mm.

Temperature profiles in the extruder from polymer entry funnel to slot die:

For polypropylene: 180° C./190° C./195° C./200° C./195° C./190° C./185° C.

Preparation of Test Specimens

Test specimen of dimension 125 mm×13 mm×3.2 mm and 125×13 mm ×1.6 mm were prepared by injection molding, and subsequently stored at a relative humidity of 45 to 55% and a temperature of 20 to 25° C. for 24 hours.

General Procedure to Test Flame Retardancy Properties in Plastics Formulations:

Test procedure of flame retardant properties

The flame retardant properties of test specimen were determined in a UL-94 fire chamber based on DIN EN 60695-11-10. The test specimen were secured in the sample holders of the UL-94 fire chamber. The burner upper surface was positioned 1 cm below the lower surface of the test specimen, the flame was positioned in a 45° angle and a heating output of 50 W. The test specimen were exposed to the flame for 10 seconds, before removing the flame. If the test specimen extinguished by itself within 10 seconds, the process was repeated until the sample burned or until 5 cycles were performed. For evaluation, the criteria summarized in the table below were used. Test specimen which exhibited fire retardant properties below rating V 2 according to DIN EN 60695-11-10 were marked as F. This rating was added to better distinguish the properties. It is not part of DIN EN 60695-11-10.

TABLE 5

| Criteria | Rating of fire retardant properties | | | |
|---|---|---|---|---|
| | F | V0 | V1 | V2 |
| Time to extinction of flame of single test specimen | >30 s | 10 s | 30 s | 30 s |
| Accumulated time to extinction of flame of 5 test specimen | >250 s | 50 s | 250 s | 250 s |
| Time to extinction of flame plus smoldering time of single test specimen after the second flame cycle | >60 s | 30 s | 60 s | 60 s |
| Falling droplets or particles | yes | no | no | yes |
| Ignition of the cotton underlay by burning particles | yes | no | no | yes |

The results are summarized in the tables below. The amounts are given in parts by weight (pbw). Comparative Examples are marked with an *.

TABLE 5

| Example | Amount of Silylamine | Silylamine | Amount of further flame retardant | Further flame retardant | Amount of Polymer | Polymer | UL 94 classification | thickness |
|---|---|---|---|---|---|---|---|---|
| 1* | — | — | — | — | 100 | Polypropylen (Moplen HF 501N) | F | 3.2 mm |
| 2* | — | — | 10 | PCO 900 | 100 | Polypropylen (Moplen HF 501N) | F | 3.2 mm |
| 3* | — | — | 10 | PCO 900 | 100 | Polypropylen (Moplen HF 501N) | F | 1.6 mm |
| 4 | 2 | A | 10 | PCO 900 | 100 | Polypropylen (Moplen HF 501N) | V0 | 1.6 mm |
| 5 | 2 | B | 10 | PCO 900 | 100 | Polypropylen (Moplen HF 501N) | V0 | 3.2 mm |
| 6 | 2 | C | 10 | PCO 900 | 100 | Polypropylen (Moplen HF 501N) | V0 | 1.6 mm |

It can be concluded that the addition of silyl-functional compounds comprising a N—O—Si bond significantly improves the flame retardant properties of the polymer compositions according to the invention.

The invention claimed is:

1. A process of preparing a flame retardant composition, the process comprising:
mixing an organic polymer component and an amount of a silyl functional component sufficient to impart a flame retardant property to the flame retardant composition, the organic polymer component including one or more of a thermoplastic polymer and a thermoset polymer, and the silyl functional component including a compound comprising a N—O—Si bond.

2. The process according to claim 1, further comprising mixing one or more crosslinking components with the organic polymer component and the silyl functional component.

3. The process according to claim 1, wherein the amount of the silyl functional component is in a range of 0.1 to 15.0% by weight based on the total weight of the organic polymer component and the silyl functional component.

4. The process according to claim 1, wherein the compound comprises a functional group comprising the N—O—Si bond, wherein the functional group has the formula (I)

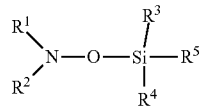

(I)

wherein $R^1$, $R^2$, $R^3$, $R^4$ and $R^5$ independently represent an organic group or a hydrogen atom.

5. The process according to claim 4, wherein $R^1$ is a hydrogen atom and $R^2$ is an organic group.

6. The process according to claim 4, wherein $R^1$—N—$R^2$ together form a cyclic group.

7. The process according to claim 6, wherein the cyclic group is selected from a heterocyclic amine group, and a cyclic imide group.

8. The process according to claim 4, wherein the compound comprises a plurality of functional groups having the formula (I).

9. The process according to claim 1, wherein the compound has a decomposition temperature of at least 140° C.

10. The process according to claim 1,
further comprising mixing at least one other flame retardant with the organic polymer component and the silyl functional component, the at least one other flame retardant being different from compound.

11. The process according to claim 10, wherein the at least one other flame retardant includes any one or more of an inorganic flame retardant, a brominated flame retardant, a phosphorus based flame retardant, a magnesium flame retardant and a nitrogen based flame retardant.

12. The process according to claim 11, wherein the at least one other flame retardant includes one or more of aluminum trihydroxide, magnesium dihydroxide, and antimony trioxide.

13. A process of preparing a flame retardant composition, the process comprising:
providing an organic polymer component including one or more of a thermoplastic polymer and a thermoset polymer,
providing a silyl functional component including a compound comprising a N—O—Si bond, and mixing the organic polymer component and the silyl functional component.

14. The process according to claim 1, wherein the amount of the silyl functional component is in a range of 0.1 to 10.0% by weight, based on the total weight of the organic polymer component and the silyl functional component.

15. The process according to claim 6, wherein the cyclic group has one or more substituents.

16. The process according to claim 6, wherein the cyclic group comprises a carbazole group or phthalimide.

* * * * *